Dec. 28, 1965  K. W. HAGANS  3,225,742
ANIMAL FEEDER
Filed March 2, 1964  2 Sheets-Sheet 1
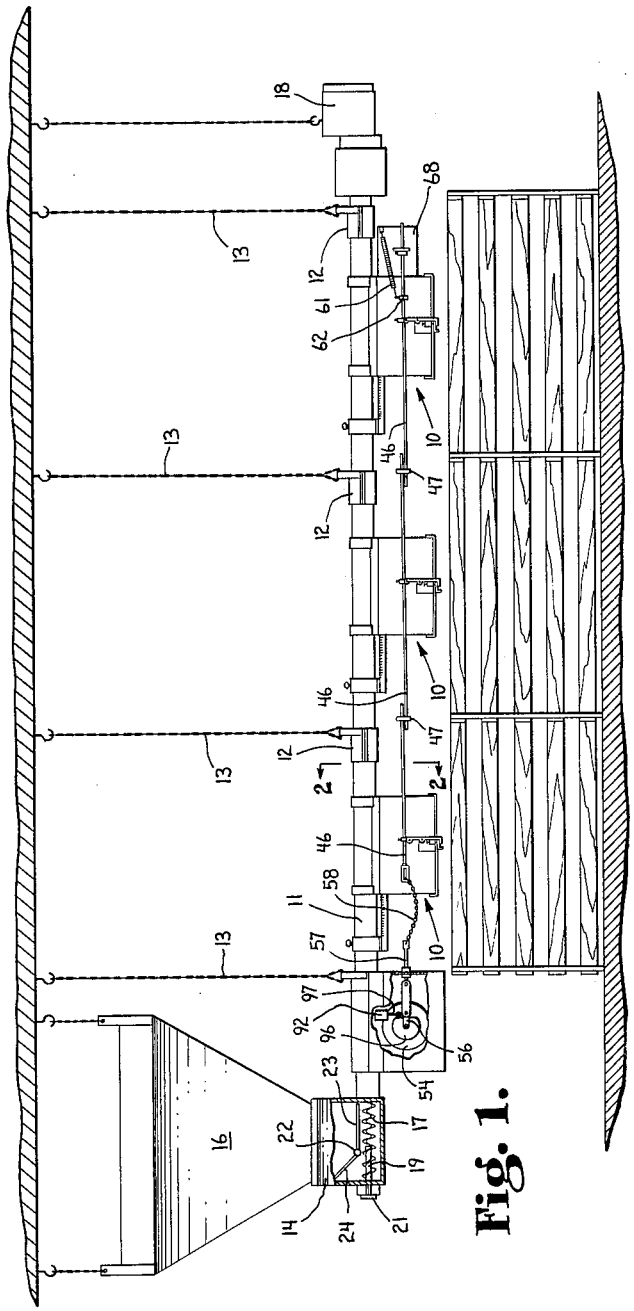
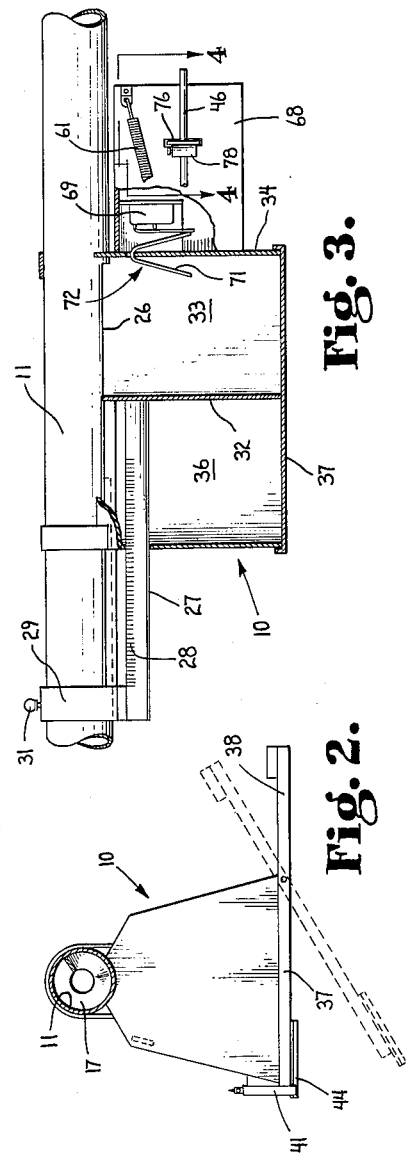
INVENTOR.
KENNETH W. HAGANS
BY
Lockwood, Woodard, Smith & Weikart
Attorneys Dec. 28, 1965     K. W. HAGANS     3,225,742
ANIMAL FEEDER Filed March 2, 1964                                               2 Sheets-Sheet 2

INVENTOR.
KENNETH W. HAGANS
BY
Lockwood, Woodard, Smith & Weikart
Attorneys

United States Patent Office 3,225,742
Patented Dec. 28, 1965

3,225,742
ANIMAL FEEDER
Kenneth W. Hagans, Mentone, Ind.
Filed Mar. 2, 1964, Ser. No. 348,596
5 Claims. (Cl. 119—51.11)

This invention relates generally to apparatus for feeding animals, and more particularly to a feeder which automatically dispenses predetermined amounts of feed into individual pens in a line of pens in an animal housing unit.

In the raising of livestock, particularly of smaller animals such as pigs, for example, it has been found desirable to employ a number of pens in a housing unit, with each pen being approximately four to five feet wide. The feed for the animals in each of the pens should be provided in limited amounts with a certain time interval provided between one feeding and the next feeding.

It is a general object of the present invention to provide a feeder capable of automatically dispensing limited amounts of feed to individual animal pens at predetermined time intervals.

A further object is to provide a feeder which minimizes exposure of feed to undesirable animals such as rodents and birds, for example.

A further object is to provide a feeder which can be easily installed at a desirable height above the floor of a group of animal pens.

A further object is to provide a feeder having completely automatic operation with fail-safe controls and wherein dispensers can be dumped manually, if desired.

A further object is to provide a feeder having the foregoing characteristics and further characterized by a simplified reliable construction and low power requirement.

Described briefly, a typical embodiment of the present invention includes a series of feed dispenser boxes or sections disposed in a line and connected to an auger tube which is connected to a hopper. A motor is connected to an auger operating in the auger tube whereby feed may be moved from the hopper into the dispenser boxes.

Each dispenser box has a volume adjuster thereon and has a dispensing lid extending across and enclosing the bottom of the box. The dispensing lid is pivotally mounted to the box and has a counterweight thereon whereby the lid will close the box so long as the box is empty. A latch is pivotally mounted to each of the boxes so that the latch can hold the lid closed during filling of the box with feed, and storage of feed in the box.

A timer controlled latch release mechanism operates at predetermined time intervals to simultaneously operate all of the latches to release all of the dispenser lids whereupon the weight of the feed in the various boxes opens the lids and the feed is discharged therefrom. The feed can be dispensed to the floor of a pen or to troughs or other receptacles.

When the feed is dispensed from the boxes, and the weight of the feed is thereupon removed from the lids, the counterweights will close the lids. In the event any of the lids fails to close properly, a switch is provided to prevent the automatic starting of the auger drive motor which would otherwise begin to fill the boxes. If all of the lids do close properly by themselves, the auger drive motor will begin the box filling operation which will continue until a sensor provided in one of the boxes indicates that all are filled as desired whereupon the sensor shuts off the auger drive motor. The system is then ready for dispensing feed at the next time designated for feeding.

The full nature of the invention will be understood from the accompanying drawings and the following description and claims.

FIG. 1 is an elevational view of a feeder installation according to a typical embodiment of the present invention.

FIG. 2 is a section taken along line 2—2 in FIG. 1 and viewed in the direction of the arrows.

FIG. 3 is an enlarged fragment of the view of FIG. 1, illustrating the dispenser farthest located from the hopper, with the front wall of the dispenser cut away to show interior details.

Figure 4:
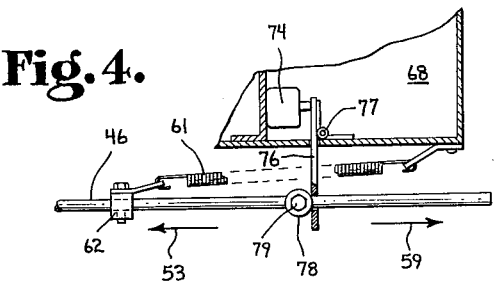
FIG. 4 is an enlarged fragmentary section taken on line 4—4 in FIG. 3 and viewed in the direction of the arrows.
Figure 5:
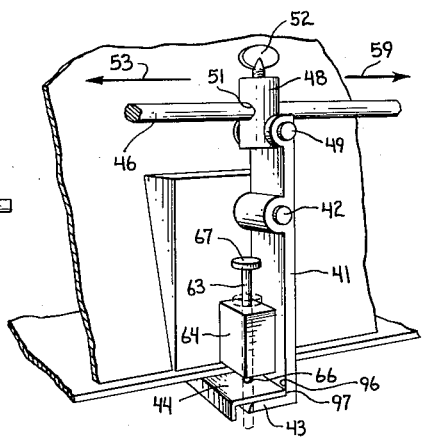
FIG. 5 is an enlarged fragmentary perspective illustrating latching details.

Referring now to the drawings in detail, an auger tube 11 is provided which, for convenience, is made up of a number of sections of tube which are secured together in line by tube clamps 12. The tube clamps also serve as convenient means for attachment of hanger chains 13 by which the whole assembly can be conveniently hung from the ceiling structure of a building, if desired.

A tapered "boot" 14 is mounted at one end of the auger tube 11 and provides convenient means for receiving feed from a storage hopper 16. The auger 17 is an open center helix typically made of high carbon spring steel (flat wire). One end of this auger is secured to the output shaft of the auger motor 18, suitable reduction gearing being provided if desired. The other end of the auger is connected to the auger anchor shaft 19 which operates in the bearing 21 in the end of the boot 14. When the auger motor operates, it moves feed from the hopper 16 through the boot 14 and along the auger tube from which it drops into the various boxes spaced along the tube. A suitable agitator roller 22 rides on the left-hand end of the auger in the boot and moves the rods 23 and 24 for agitation of the feed in the boot to insure a steady flow of feed.

The dispenser boxes 10 are mounted along the auger tube, and the spacing is typically such that one box is provided for each animal pen in a line of animal pens. The top of each dispenser box fits the tube so that the aperture 26 provided in the bottom of the tube and registering with the box is effective to dump feed into the box as the auger is operated. In order to provide control of the amount of feed which can be contained in a dispenser box, a volume gauge assembly is provided for each box and includes a slide 27 movable into and out of the box and having calibrations 28 thereon, the slide end having a bracket 29 received on the tube with a thumb screw 31 for securing the bracket in any desired position on the tube. The slide has a rigid baffle 32 extending downwardly therefrom and into the box and, because of this baffle, only the portion 33 of the box between the baffle 32 and the end 34 opposite the slide is available for storage of feed.

The tube slot 26 is provided of a length sufficient to permit rapid fill of the box if the volume control is to be adjusted to allow complete filling of the box. However, where a limited degree of fill is desired, the baffle is moved to the position such as shown in the drawing and the slide covers a portion of the tube slot to avoid filling the volume 36 behind the baffle. A box can be completely closed by moving the slide all the way in.

Each of the boxes has a dispensing lid 37 which is hinged to the box along the lower margin of the rear wall of the box, although the specific nature of the hinge is not critical. The lid has a counterweight frame 38 balancing the portion of the lid opposite the hinge from the counterweight. The balancing of the lid is such that the lid will remain closed until the box contains 1½ to 2 pounds of feed, whereupon the weight of the feed acting on the lid will overcome the counterweight and pivot the lid downwardly to dispense the feed. Typically, the maximum capacity of the box is 11 to 14 pounds of feed. These values are strictly examples, the important feature being the ability of as small amount of feed as desired to open the lids for dispensing thereof, with the balancing of the lids being such that upon the dispensing of the feeds, the lids will close by themselves.

In order to prevent dumping of the box every time a small amount of feed enters it, latches are provided to maintain the lids in the box closing condition until dispensing is desired. In the illustrated embodiment, each latch 41 is pivotably mounted to a pin 42 secured to the front wall of the box. The latch has a hook 43 received under the lid strike portion 44 of the lid member, thereby retaining the lid in the closed condition. Simultaneous release of the latches is desired and, for this purpose, a latch release rod 46 is provided and, for convenience, may be furnished in sections secured together by rod clamps 47.

Each latch has a block 48 pivotally mounted thereto by means such as a screw 49, for example. The block is slidably received on the rod 46 by means of the aperture 51 in the block, but is then secured in position on the rod by means of a thumb screw 52. The slidable reception of the block 48 on the rod 46 is only for purposes of adjustment and, once the latches and rod assembly are properly adjusted, the blocks 48 are secured to the latch release rod 46 by the use of the thumb screws 52.

Release of the latches can be obtained by movement of the latch release rod in the direction of the arrow 53. To obtain this actuation of the rod, an actuator motor 54 is provided with an output shaft having a crank 56 connected thereto, the crank being connected to the pull rod 57 which is movable linearly upon rotation of the crank. A chain or other flexible connector 58 is provided between the rod 57 and the latch release rod 46. The action of the crank and the required movement of the latch release bar to release the latches are such that a certain amount of lost motion can be tolerated and is, in fact, desirable, and is provided for by the slack in the chain 58. This makes it easy to assemble the units together without binding or other loading, and also prevents the exact stopping position of the motor from becoming a critical element in the operation of the device.

In order to return the latch release rod in the direction of arrow 59, after it has been actuated in the direction of arrow 53, a return spring 61 is provided, with one end thereof being attached to a fixed portion of the feeder and the other end being attached to a pull block 62 secured to the latch release rod 46. However, for a purpose which will become apparent as the description proceeds, it is desirable to prevent movement of the latch release rod in the direction of the arrow 59 whenever any of the dispensing lids fails to close after dispensing feed. For this purpose, a safety pin 63 is mounted in a block 64 mounted to each of the boxes, the pin being vertically slidable in the block 64. The pin may be weighted if desired in order to assure that it will fall by gravity whenever the strike 44 descends upon the movement of the lid from the closed position. Normally, the lower end 66 of the safety pin is engaged by the upper surface of the lid strike 44 which holds the safety pin in a passive condition as shown. However, when the lid moves from the closed position to an open position for dispensing feed, the safety pin is no longer supported thereby whereupon it will drop by gravity to an active position shown by the dotted outline where it is retained by the head 67 supported by the block 64. In this active position of the safety pin, it is disposed in the path of the hooked portion 43 of the latch, and will prevent the latch from returning to the normal lid latching position. Therefore, it is impossible for the latches or the latch release rod to return to the original condition unless all of the dispensing lids have returned to the box closing positions thereof.

In order to operate the auger motor for filling the various dispenser boxes, an auger motor control unit 68 is mounted on the end of the dispenser box furthest from the supply hopper 16. This control unit includes a switch 69 in circuit with the auger drive motor 18 to energize the motor when the last box is dumped, and deenergize the motor when the last box is filled to the desired extent. To operate this switch 69, a fill sensor paddle 71 is pivotably mounted to the end wall 34 of the box to which the motor control unit is mounted. When the box has filled to the extent desired, the paddle 71 is moved in the direction of the arrow 72 whereupon it opens the switch 69 to deenergize the auger drive motor. At this time, all of the boxes will be filled to the extent desired, because each of the previous boxes in line will be filled before the last box. The volume gauge of each box determines the amount of feed which will enter each of the boxes, and this is true also of the last box in the line.

It is necessary that the auger drive motor does not function to operate the auger unless all of the dispenser lids are closed. To achieve this, a latch position sensor switch 74 is mounted in the unit 68 and is operable by a lever arm 76 pivotally mounted at 77. A collar 78 is secured to the latch release rod by means of the set screw 79. When the latch release rod moves in the direction 53, the switch 74 is opened to disable the auger drive motor. After dispensing the feed from all of the boxes, and as soon as all of the dispensing lids are closed, the latches can return to their initial positions whereupon the latch release rod 46 has moved in the direction 59 to the initial position whereupon the collar 78 has contacted the lower end of the lever 76 and moved it to close the switch 74.

Figure 6:
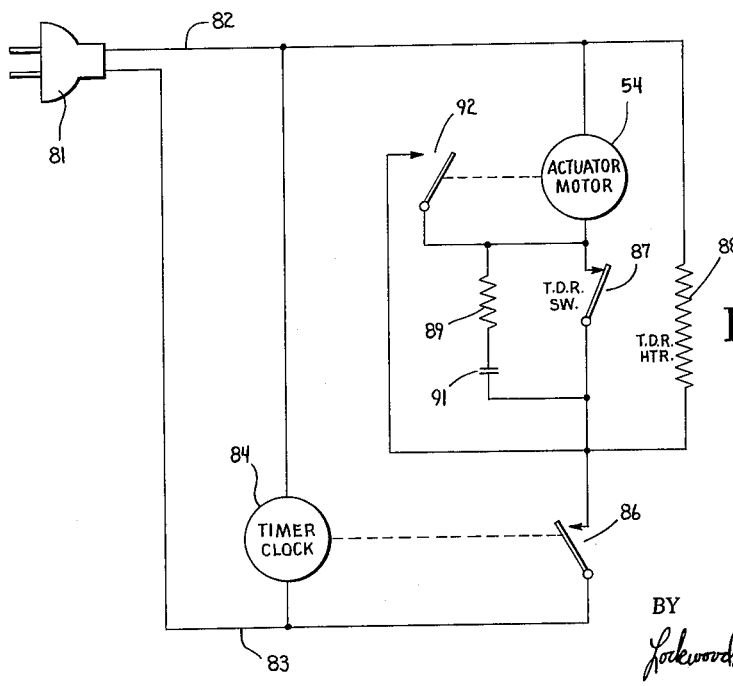
FIG. 6 is an electrical schematic diagram of the dispensing control circuitry.

The periodic dispensing of feed is obtained by the use of a 24 hour timer which will energize the actuator motor at the desired time. The manner in which this is accomplished will be better understood upon reference to the electrical schematic diagrams herein. In FIG. 6, an electrical plug 81 is provided which may be connected to a 115 volt A.C. power source, for example. Two electrical conductors 82 and 83 extend from the plug 81. The timer includes an electric clock 84 connected across the wires 82 and 83 and having suitable mechanism connected thereto for operating a normally open switch 86 at predetermined selected times. Such clocks are well known in the art. One example has selection levers at fifteen minute intervals which, when pulled out, will close the switch at the time selected and allow it to open about fifteen minutes thereafter.

The latch release actuator motor 54 is connected in series with a normally closed time-delay relay switch 87 and the normally open clock-operated switch 86, this series combination being connected across the conductors 82 and 83. A time-delay relay heater 88 is connected in series with the clock-operated switch 86, this series combination being connected across the conductors 82 and 83. Resistor 89 and capacitor 91 are connected across the time-delay relay switch contacts 87 to prevent arcing.

An actuator motor shaft position sensor switch 92 is also connected across the time-delay relay switch 87, this position sensor switch being operated by the actuator motor in response to the actuator motor shaft position.

Figure 7:
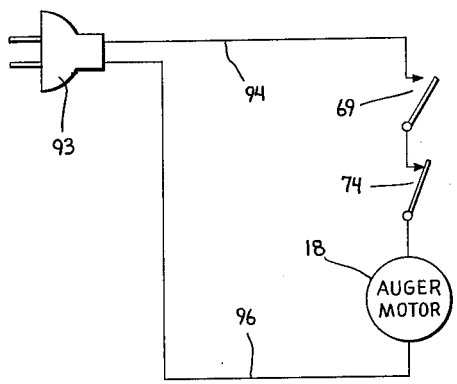
FIG. 7 is an electrical schematic diagram of the conveyor control circuitry.

The electrical connection of the auger drive motor will be understood from the schematic diagram shown in FIG. 7. It includes the electrical line plug 93 for connection to a 110 volt A.C. source, for example. The auger motor 18 is connected in series with the normally closed latch position sensor switch 74 and the normally open, filled-condition sensor switch 69, this series arrangement being connected across the electrical supply lines 94 and 96.

In the operation of the present invention, if it is assumed that all of the feed dispenser boxes are full, then the fill condition sensor paddle 72 will have moved the fill condition sensor switch 69 to its normally open condition and will have broken the circuit to the auger drive motor 18 placing the auger at rest.

The timer clock motor is continuously operating and when the time for dispensing feed has arrived, the timer clock mechanism will close the switch 86 which will close the circuit through the actuator motor 54 and time-delay relay switch 87 to energize the actuator motor. The actuator motor will then proceed to move the crank 56 in a circle and pull the latch release rod to unlatch the dispenser lids and thereby dispense feed from all of the boxes. The speed of the actuator motor crank is such that the dispenser lids have ample time to close automatically by reason of their counterbalancing before the crank has moved to a position where it will allow the latch release rod return spring to return the latches to the latching position. Meanwhile, however, the time-delay relay heater 88 will have opened the switch 87. In order to prevent the opening of switch 87 from deenergizing the actuator motor until the crank has made a complete revolution, the motor shaft may have a cam 96 thereon which works the follower 97 to close a hold switch 92 for a period beginning shortly after the crank rotation has been started by closure of the timer-operated switch 86. When the crank has again returned near to its initial position, the cam will release the switch 92 allowing it to open, whereupon the actuator motor is deenergized, even though the switch 86 may remain closed. By the time the actuator motor has completed one revolution of the crank and again becomes deenergized, the dispenser lids will have closed and the latches will have returned to their initial lid latching position. The fact that the timer clock switch may still not have opened by this time will not cause energization of the actuator motor again, because the time-delay relay switch remains open. At some reasonable time thereafter, depending upon the clock construction, the switch 86 will open whereupon the time-delay relay heater will cool allowing the time-delay relay switch 87 to close to return the actuator control circuit to the initial condition awaiting the next closure of the switch 86 which will occur at the next feeding time preselected on the clock.

It will be observed that immediately upon dispensing feed from the box having the fill condition sensor therein, the switch 69 will close. This does not energize the auger motor because the latch position sensor switch 74 is open. This switch 74 is opened in response to actuation of the latch release rod so that immediately before the dispensing lids open, the switch 74 opens to disable the auger motor circuit, even though switch 69 may then become closed as the feed is dispensed from the last box in the line. When all of the dispenser lids have returned to the closed position, thereby moving the safety pins out of the way, all of the latches may return to their initial positions allowing the latch release rod to return to its initial condition whereupon the collar 78 thereon will move the lever 76 to close the switch 74 and energize the auger motor 18. Feed will be drawn from the storage hopper 16 through the tube 11 filling the boxes in succession along the way and as soon as the last box is filled sufficiently the sensor paddle will open the switch 69 to deenergize the auger motor. The auger will then remain at rest until the feed is dispensed the next time.

In case there is an electrical failure which prevents the timer from causing the actuator motor to dispense the feed at the proper time, the latch release rod may be pulled manually to dispense feed from the boxes. In the event it is desired to dispense feed from one box only, the thumb screw 52 may be loosened to allow the latch to move without moving the latch release rod, whereupon the latch can be moved to the lid release position for that particular dispensing box.

For best operation, it is desirable that all of the connections of the latches to the latch release rod be such that the travel of the latch release rod in the direction 59 is stopped upon return by the spring 61 only by the engagement of one of the latches with the lid strike of its respective box. It is usually desirable that the particular latch employed for this purpose be that on the box nearest the hopper. The return of the latch release rod is stopped by the abutting engagement of the face 96 of the latch with the edge 97 of the lid strike 44. If desired, however, the stopping of the latch can be accomplished by abutting engagement with the block 64 instead of the lid strike. By having this one latch in control of the rest position of the latch release rod, the adjustment of the collar 78 for proper and timely operation of the latch position sensor switch 74, is facilitated.

From the foregoing description, it will be recognized that the present invention is quite well adapted to achievement of the objects set out herein as well as providing other advantages not specifically mentioned.

While the invention has been disclosed and described in some detail in the drawings and foregoing description, they are to be considered as illustrative and not restrictive in character, as other modifications may readily suggest themselves to persons skilled in this art and within the broad scope of the invention, reference being had to the appended claims.

I claim:

1. An automatic feeder for animals, said feeder comprising:
    a series of feed dispenser boxes;
    a feed storage device;
    conveyor apparatus including a conveyor tube connected to said storage device and to said boxes and communicating with said storage device and said boxes through apertures therein, said conveyor tube having an auger therein operable to convey feed from said storage device to said boxes;
    calibrated box capacity adjusters, each adjuster being adjustably mounted to one of said boxes and having means thereon movable to limit the volume in the box available for containment of feed;
    a dispensing lid closing each of said boxes and pivotable between closed and open positions, each dispensing lid supporting feed in the box to which it is mounted and movable by the feed therein from said closed position to said open position to dispense feed from said box, and each dispensing lid having a balancing counterweight thereon to return said dispensing lid to closed position when the feed in a box has been dispensed therefrom;
    a plurality of latches, each latch being mounted to one of said boxes and pivotable between a first position latching one of said dispensing lids in the closed position, and a second position releasing said dispensing lid;
    a latch release rod connected to said latches and operable, when actuated, to move said latches simultaneously to the second position of each;
    a vertically extending weighted safety pin slidably mounted on each of said boxes, each of said safety pins being engaged and held in a passive position by one of said dispensing lids when said dispensing lid is in a closed position, and each safety pin being movable by force of gravity to an active position when the dispensing lid by which it was engaged is moved to an open position, said safety pins being disposed, when in the active positions thereof, in the path of said latches to prevent return of said latches from said second positions thereof to said first positions thereof;

a latch release motor having a crank thereon coupled by a flexible connector to said latch release rod and operable, when energized, to actuate said latch release rod;

a timer controlling said latch release motor to energize said latch release motor at predetermined times;

a fill sensor in the one of said boxes which is most remote from said storage device, said sensor being movable in response to change in the amount of feed contained by said most remote box;

a fill sensor switch operable by said fill sensor, said switch being closed by said sensor when the quantity of feed stored in said box is less than a predetermined desired amount;

a latch position sensor switch operable by said latch release rod to open said latch position sensor switch when said latches are moved from said first positions thereof to said second positions thereof and to close said latch position sensor switch when said latches have returned to said first positions;

and a conveyor drive motor coupled to said conveyor to operate said conveyor to convey feed from said storage device to said boxes, said conveyor drive motor being connected in circuit with said fill sensor switch and said latch position sensor switch whereby said conveyor drive motor is automatically energized only when both of said switches are closed in response to sensing of the unfilled condition of said most remote box and the return of all of said latches to the first positions thereof.

2. An automatic feeder for animals, said feeder comprising:

a series of feed dispenser boxes;

a feed storage device;

conveyor apparatus communicating with said storage device and said boxes and operable to convey feed from said storage device to said boxes;

a dispensing member mounted on each of said boxes and movable between closed and open positions, each dispensing member supporting feed in the box to which it is mounted and movable by the feed therein from said closed position to said open position to dispense feed from said box, and each dispensing member having balancing means thereon to return said dispensing member to closed position when the feed in a box has been dispensed therefrom;

a plurality of latches, each latch being mounted to one of said boxes and movable between a first position latching one of said dispensing members in the closed position, and a second position releasing said dispensing member;

a latch release member connected to said latches and operable, when actuated, to move said latches simultaneously to the second position of each;

a safety member on each of said boxes, each of said safety members being engaged and held in a passive position by one of said dispensing members when said dispensing member is in a closed position, and each safety member being movable to an active position when the dispensing member by which it was engaged is moved to an open position, said safety members being disposed, when in the active positions thereof, to prevent return of said latches from said second positions thereof to said first positions thereof;

a latch release motor coupled to said latch release member and operable, when energized, to actuate said latch release member;

a timer controlling said latch release motor to energize said latch release motor at predetermined times;

a fill sensor in the one of said boxes which is most remote from said storage device, said sensor being movable in response to change in the amount of feed contained by said most remote box;

a fill sensor switch operable by said fill sensor, said switch being closed by said sensor when the quantity of feed stored in said box is less than a predetermined desired amount;

a latch position sensor switch operable by said latch release member to open said latch position sensor switch when said latches are moved from said first positions thereof to said second positions thereof and to close said latch position sensor switch when said latches have returned to said first positions;

and a conveyor drive motor coupled to said conveyor to operate said conveyor to convey feed from said storage device to said boxes, said conveyor drive motor being connected in circuit with said fill sensor switch and said latch position sensor switch whereby said conveyor drive motor is automatically energized only when both of said switches are closed in response to sensing of the unfilled condition of said most remote box and the return of all of said latches to the first positions thereof.

3. An automatic feeder for animals, said feeder comprising:

a series of feed dispenser boxes;

a feed storage device;

conveyor apparatus communicating with said storage device and said boxes and operable to convey feed from said storage device to said boxes;

a dispensing member mounted on each of said boxes, each dispensing member being movable from a closed position to an open position to dispense feed from said box, and each dispensing member having means thereon to return said dispensing member to closed position when the feed in a box has been dispensed therefrom;

a plurality of latches, each latch being mounted to one of said boxes and movable between a first position latching one of said dispensing members in the closed position, and a second position releasing said dispensing member;

a latch release member connected to said latches and operable, when actuated, to move said latches simultaneously to the second position of each;

a latch release motor coupled to said latch release member and operable, when energized, to actuate said latch release member;

a timer controlling said latch release motor to energize said latch release motor at predetermined times;

a fill sensor in one of said boxes and movable in response to change in the amount of feed contained by said box;

a fill sensor switch operable by said fill sensor;

a latch position sensor switch operable by said latch release member;

and a conveyor drive motor coupled to said conveyor to operate said conveyor to convey feed from said storage device to said boxes, said conveyor drive motor being connected in circuit with said fill sensor switch and said latch position sensor switch whereby said conveyor drive motor is automatically energized only when both of said switches are closed in response to sensing of the unfilled condition of said box and the return of all of said latches to the first positions thereof.

4. A feeder for animals, said feeder comprising:

a series of feed dispenser boxes;

a feed storage device;

conveyor apparatus communicating with said storage device and said boxes and operable to convey feed from said storage device to said boxes;

a dispensing member mounted on each of said boxes, each dispensing member being movable from a closed position to an open position to dispense feed from said box, and each dispensing member having means thereon to return said dispensing member to closed position when the feed in a box has been dispensed therefrom;

a plurality of latches, each latch being mounted to one of said boxes and movable between a first position latching one of said dispensing members in the closed position, and a second position releasing said dispensing member;

a latch release member connected to said latches and operable, when actuated, to move said latches simultaneously to the second position of each;

a latch release motor coupled to said latch release member and operable, when energized, to actuate said latch release member;

a fill sensor in the one of said boxes and movable in response to change in the amount of feed contained by said box;

a fill sensor switch operable by said fill sensor;

a latch position sensor switch operable by said latch release member;

and a conveyor drive motor coupled to said conveyor to operate said conveyor to convey feed from said storage device to said boxes, said conveyor drive motor being connected in circuit with said fill sensor switch and said latch position sensor switch whereby said conveyor drive motor is automatically energized only when both of said switches are closed in response to sensing of the unfilled condition of said box and the return of all of said latches to the first positions thereof.

5. A feeder for animals, said feeder comprising:

a plurality of feed containers;

conveyor means coupled to said containers to convey feed thereto;

a dispenser member connected to each of said containers, each dispenser member supporting feed in the container to which it is connected, and each dispenser member being movable, by the feed it supports, from a container closing condition to a container opening condition to dispense feed from the container;

means latching said dispenser members in container closing condition, said latching means being operable, when actuated, to release said dispenser members and disable said conveyor means;

retainer means movable in response to opening of said dispenser members to hold said latching means in actuated condition and thereby maintain the disabled condition of said conveyor means until all of said dispenser members have returned to the container closing condition;

and fill condition sensor means in one of said containers and coupled to said conveyor means to operate said conveyor means for filling said containers in response to the sensing of an insufficiently filled condition in said one container.

References Cited by the Examiner

UNITED STATES PATENTS 3,033,163  5/1962  Hostetler et al. _____ 119—52
3,144,173  8/1964  France et al. _____ 119—56 X

FOREIGN PATENTS 34,622  6/1925  Denmark.

SAMUEL KOREN, *Primary Examiner.*

HUGH R. CHAMBLEE, *Examiner.*